April 29, 1958 H. T. KUCERA 2,832,870
WEATHER MODIFIED TIME CONTROLLED TEMPERATURE REGULATOR
Filed June 20, 1956 3 Sheets-Sheet 1

INVENTOR.
Henry T. Kucera
BY
Eugene M. Giles atty.

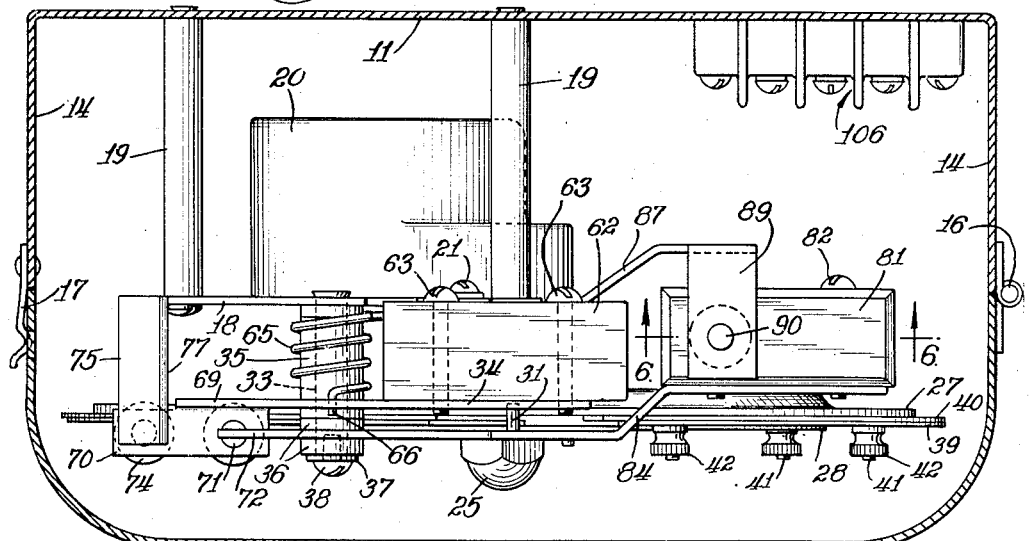
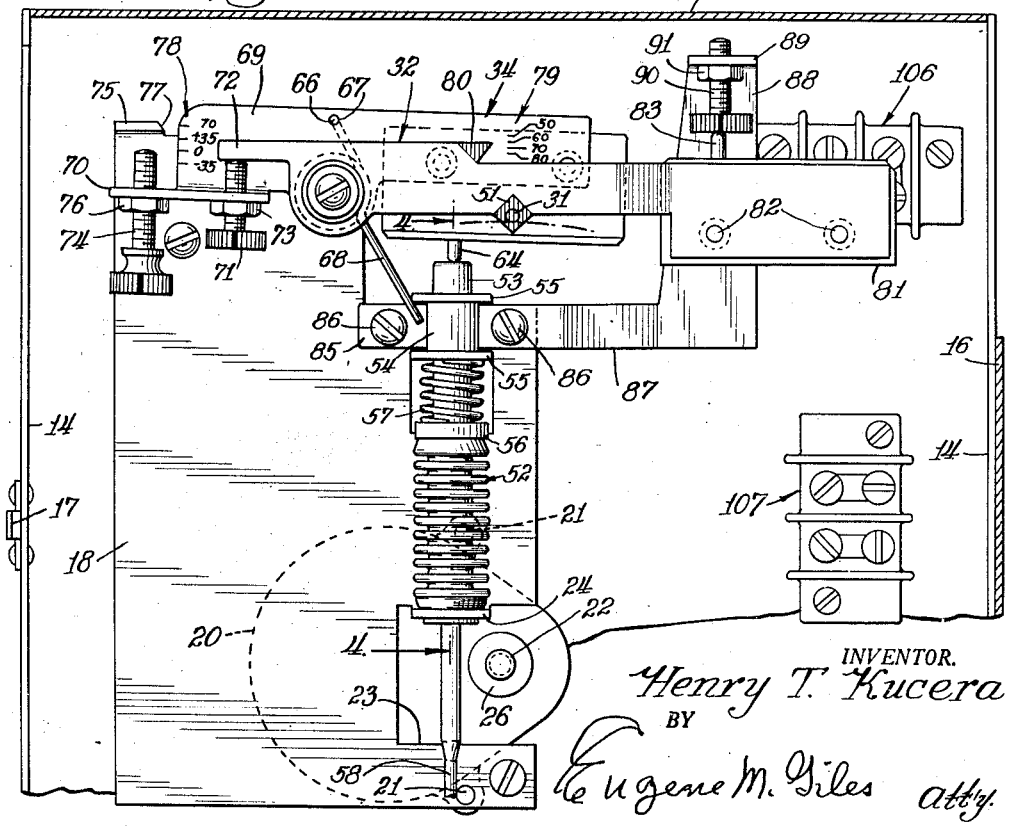

April 29, 1958 H. T. KUCERA 2,832,870
WEATHER MODIFIED TIME CONTROLLED TEMPERATURE REGULATOR
Filed June 20, 1956 3 Sheets-Sheet 3
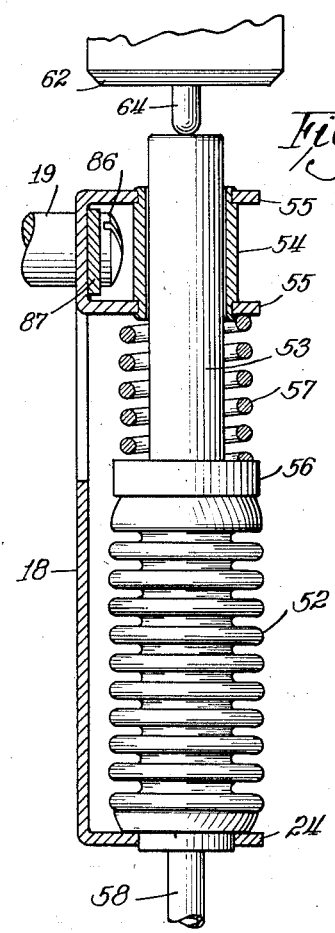
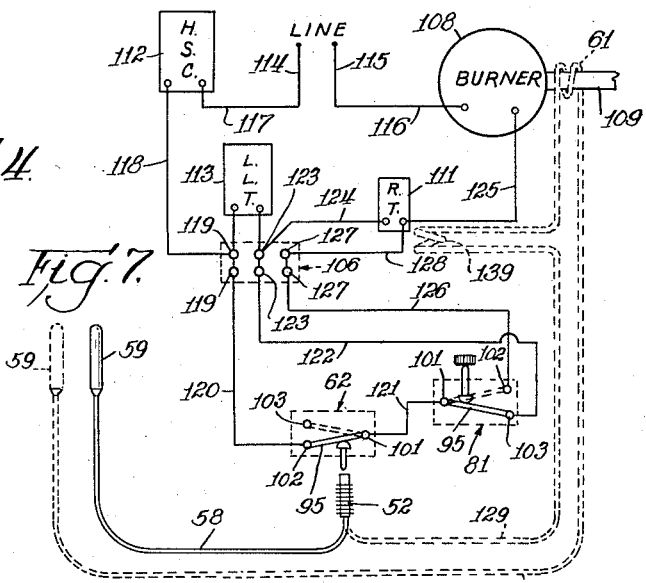
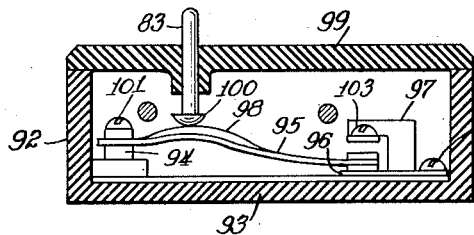
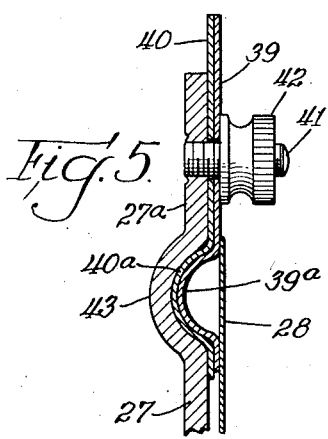
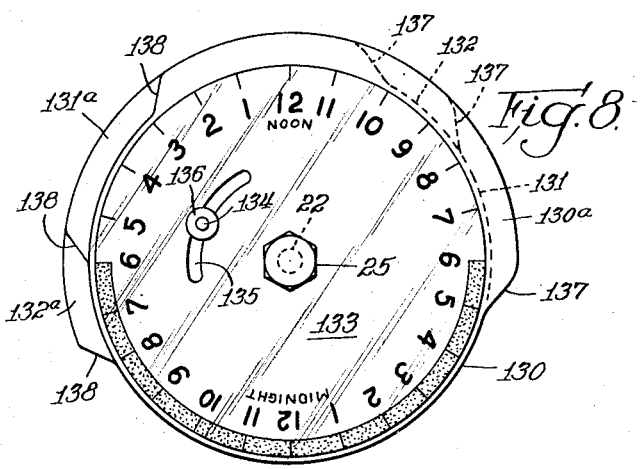
INVENTOR.
Henry T. Kucera
BY
Eugene M. Giles
atty.

United States Patent Office 2,832,870
Patented Apr. 29, 1958

2,832,870

WEATHER MODIFIED TIME CONTROLLED TEMPERATURE REGULATOR

Henry T. Kucera, La Grange, Ill.

Application June 20, 1956, Serial No. 592,575

17 Claims. (Cl. 200—136.3)

This invention relates to instrumentalities for regulating the operation of a heating or cooling system to heat or cool the place serviced thereby only at selected times to the temperature ordinarily or normally required, as for example during such times as the serviced place is occupied or in use, and to reduce the operation of the system at other times to a low economical minimum, and has reference more particularly to time controlled facilities which are weather supervised to coordinate the operation of the heating or cooling system with the weather temperature in a manner to insure provision of such ordinarily or normally required temperature throughout the required time and to safeguard against activity or inactivity of the system when the weather temperature is sufficiently high or low that such activity or inactivity would be inappropriate.

In general, this invention pertains to weather modified timing facilities of a type somewhat similar to that of my Patent No. 2,333,319 of November 2, 1943, which are cooperable with other controls for regulating, for example, the heating system in a home or other place of residence so as to provide the temperature required for residence comfort during the daytime and such part of the night as the residence activities are continued, and to reduce the operation of the heating system thereafter to a safe minimum until heating is required again for daytime comfort, or to control the heating system of a place of business or the like so as to provide a selected normal comfort temperature during business hours or other time of use when normal comfort temperature is required, and to minimize the operation of the heating system at other times, or the invention may be employed for control of cooling systems in like manner to provide normal cooling only at the times needed and to minimize the operation of the cooling system at other times.

The principal objects of the present invention are to improve and simplify time controlled devices for minimizing the operation of heating or cooling systems at selectable times when normal heating or cooling is not needed; to provide appropriately early initiation and late termination of heating or cooling according to weather conditions to insure normal heating or cooling throughout the time required; to permit master control of the system by the weather at selected upper and lower temperature limits thereof which will prevent overheating or underheating in the case of a heating system or overcooling or undercooling in the case of a cooling system; to adapt the device for applicability to existing controls by which the operation of the heating or cooling system is regulated; to permit any desired cycling of the times of normal heating or cooling and the times of minimized operation of the system in repetitive similar 24-hour cyclings or in 7 day groups of selectively dissimilar 24-hour cyclings if desired; and in general to insure maximum economy with assured heating or cooling to the desired temperature throughout the entire time that such temperature is required; these and other objects being accomplished as pointed out more particularly hereinafter and as shown in the accompanying drawings, in which:

Fig. 2 is a view taken substantially on the line 2—2 of Fig. 1;

Fig. 3 is a view similar to that of Fig. 1 with the timing dial and cam mechanism removed and showing the cam operated arm in upraised position which it occupies at the time of normal heating;

Fig. 4 is an enlarged side view partly in section on the line 4—4 of Fig. 3 of a part of the weather control facilities;

Fig. 5 is an enlarged sectional view on the line 5—5 of Fig. 1;

Fig. 6 is a sectional view of one of the switches taken on the line 6—6 of Fig. 2;

Fig. 7 is a wiring diagram of the device of Fig. 1 and its connection to facilities operated thereby; and Fig. 8 is a front view of the timing dial and cam facilities for providing 24 hour cycling of the device.

Figure 1:
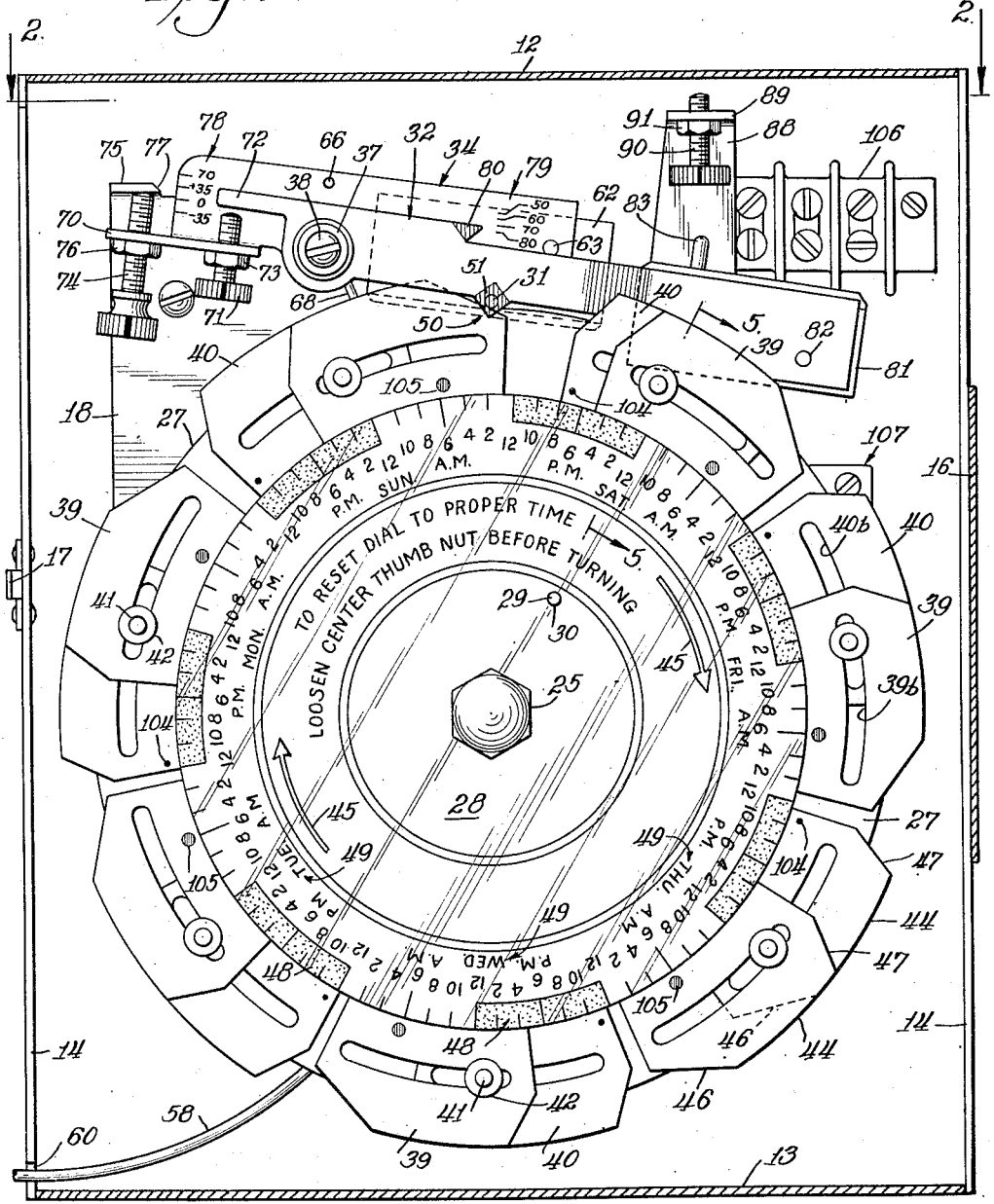
Fig. 1 is a front view of an embodiment of the present invention adapted for groups of selectable consecutive dissimilar daily cyclings of a heating system and showing the cam operated arm thereof in the depressed position of minimum or reduced heating.

Referring to the drawings, in which I have shown the invention in its application to a heating system, the reference numeral 11 indicates the back wall of a case in which the weather modified time controls are enclosed, the said case having top and bottom walls 12 and 13 respectively and two opposite side walls 14 extending forwardly from the back wall 11 and 15 is a cover at the front of the case affording access to the interior thereof and hinged to one of the side walls as at 16 and having latching engagement as at 17 with the other side wall for holding the cover in the closed position.

A frame 18 composed of a flat plate with cut out places and parts bent therefrom is mounted on the back wall 11 at a distance in front of the latter by intervening spacing posts 19 and an electric motor 20 of clock operating type is mounted on the back of the frame 18 in any convenient manner, as for example by fasteners 21.

This clock motor is of a conventional type having a spindle 22 geared thereto to rotate at a constant speed in clockwise direction, as viewed in Fig. 3, at the rate of one revolution in seven days and thus this spindle turns one seventh of a revolution in each 24 hours.

The plate of the frame 18 has a cut out place 23 with an integral ear or lug 24 bent forwardly from the plate at the top of the cut out 23, for a purpose hereafter explained, and the spindle 22 projects forwardly through this cut out place for mounting of a combined dial and cam assembly on the outer end thereof at a distance from the plate or frame 18 beyond the outer end of the aforesaid ear or lug 24, the forward end of the spindle 22 being externally threaded to receive a clamping cap nut 25 thereon and the spindle having a relatively wide annular shoulder 26 therearound at the base of the threading and against which the aforesaid combined dial and cam assembly is clamped by the nut 25 for rotation with the spindle.

The said combined dial and cam assembly, which is shown in full in Fig. 1 and a detail view thereof shown in Fig. 5, comprises a large relatively thick and stiff cam plate 27 with a smaller thin circular dial plate 28 at the front, both of which are centrally apertured to engage on the threaded outer end of the spindle 22 and are conjointly securable thereon by the cap nut 25 which clamps them against the shoulder 26 of the spindle to rotate therewith, and the cam plate 27 has a pin 29 projecting forwardly therefrom and engaging through an opening 30 of the dial plate to key them together in a fixed position of orientation to one another and cause them to rotate with the spindle in unison.

The combined dial and cam assembly is of seven day timing and control type appropriate for a full week period of control of the heating system during the seven day time of rotation of the spindle 22, and provides similar consecutive repeated seven day control thereof as the rotation of the spindle 22 is continued by the operation of the clock motor 20, and for effecting the seven day control, the cam plate 27 has seven pairs of cam segments adjustably secured thereon at seven respective places therearound so that they project beyond the periphery of the cam plate 27 in a position so that their outer edges are engageable with a follower pin 31 on the back of a lever or arm 32, hereafter referred to as the front arm, which is pivoted on the frame 18 to be swung to upper and lower positions at times and in a manner determined by the cam segments as explained more fully hereinafter.

This front arm 32 is located at a distance from the frame plate 18 as shown in Fig. 2 on a stud 33 which is secured to and projects forwardly from the plate 18, the said front arm 32 being located in front of another arm 34 which is likewise pivoted on the stud 33 and is referrerd to hereinafter as the rear arm.

This rear arm 34 is secured to a sleeve 35, near the outer end thereof, which is mounted on the stud 33 and the front arm 32 has a hub portion 36 engaged on the stud 33 in front of the sleeve 35 and both the sleeve 35 and hub portion 36 are held on the stud by a washer 37 and a cap screw 38 which is threaded into the outer end of the stud 33, the arrangement being such that the arms 32 and 34 are free to move conjointly and also independently in their pivotal movement on the stud 33.

The follower pin 31 is preferably located, as shown in Fig. 1, directly above the spindle 22 in the vertical plane of the axis of rotation of the spindle and as indicated more particularly hereinafter the extreme outer edges of the cam segments and the outer periphery of the cam plate 27 determine the extreme upper and lower positions respectively to which the front arm 32 is movable in the operation of the device.

The cam segments are preferably, although not necessarily, all of approximately the same form, each pair thereof being indicated by the same reference numerals 39 and 40 respectively, the former of which will be referred to hereinafter for convenience as the outer segment or the leading segment, and the latter as the inner segment or the trailing segment, and these segments are made of a relatively thin sheet metal or the like, and each pair is secured to the cam plate by a separate one of seven threaded studs 41 which are equally spaced apart circumferentially around and project forwardly from the front face of the cam plate 27 and each of which has a thumb nut 42 thereon by which the cam segments are secured to the cam plate.

The cam plate 27 is formed with an annular corrugation 43 therearound which has the channel side thereof at the front of the cam plate and is concentric with the central opening of the cam plate by which the latter is located and secured on the spindle 22, and beyond this corrugation the cam plate has a flat annular margin 27ᵃ with the cam segment fastening studs 41 positioned approximately midway of the width thereof.

The mating cam segments 39 and 40 of each pair have matching arcuate corrugations 39ᵃ and 40ᵃ corresponding to the curvature of the corrugation 43 of the disk 27 and conjointly seating therein, the corrugation 39ᵃ in the corrugation 40ᵃ and the latter in the corrugation 43 for orienting the cam segments in a definite relation to the cam plate 27.

The cam segments are adapted for adjustment circumferentially of the plate 27 conjointly and individually and relatively to one another and for this purpose each plate 39 and 40 has a corresponding long arcuate slot 39ᵇ and 40ᵇ respectively concentric with the respective corrugations 39ᵃ and 40ᵃ and having the respective stud 41 extending through the said slots so that when the nut 42 is loosened the pair of cam plates may be adjusted conjointly and also relatively to one another in a circumferential direction to any extent permitted by the slots 39ᵇ and 40ᵇ and clamped in this adjusted position by the nut 42.

All of the cam segments have corresponding outer edge portions 44 which when the segments are secured in place on the cam plate 27, lie in the same circle concentric with the center of the plate 27, and each outer cam segment 39 has at the end thereof which leads in its movement in the aforesaid clockwise direction, indicated by the arrows 45 in Fig. 1, an edge portion 46 which slopes inward at a gradual slope from the outer edge portion 44, and each inner cam segment 40 has at its rear or trailing end an edge portion 47 which slopes abruptly inward and both sloping portions 46 and 47 being continued inwardly to points within the periphery of the cam plate 27 as shown in Fig. 1.

It is preferable, but not essential, that both cam segments 39 and 40 be sloped at the leading end as at 46 and sloped at the trailing end as at 47 so that they match when superposed one directly over the other, as the same cutting dies may then be used for both and the proper leading end and trailing end slope is provided irrespective of which one of the pair of cam segments is adjusted in advance of the other.

The dial plate 28 which is preferably of a size to overlap the inner portions of all the cam segments 39 and 40 and extend beyond the grooves 39ᵃ and 40ᵃ thereof, as indicated in Fig. 5, has time calibrations around the periphery thereof, each interval between adjoining calibrations in the illustrated dial of Fig. 1 representing a two hour extent of rotation of the dial by the spindle 22 and such calibrations are provided for seven full days, the calibrations for each consecutive 24 hours being indicated as two consecutive 12 hour periods, the expanse of the corresponding 12 hour period of each 24 hour period being represented in black or darkened, as indicated at 48 to indicate the P. M. time period, and distinguish it from its companion A. M. 12 hour period, and the respective consecutive 24 hour periods are preferably identified by the respective consecutive days of the week to which they are applicable, abbreviations being used on the dial 28—namely "Sun.," "Mon.," "Tue.," "Wed.," "Thu.," "Fri.," and "Sat.," as indicated at 49.

For setting the combined dial and cam assembly for proper timing operation, the clamping nut 25 is loosened and the place is selected on the periphery of the dial 23 which corresponds, according to the week day marking 49 and the A. M. or P. M. period of the dial and the 2 hour calibrations and markings of that period, to the day of the week and the A. M. or P. M. period and the time of that period at which the setting is being made, and the dial 28, and together with the cam plate 27, is turned until that selected place is at the top of the dial directly underneath the follower pin 31, whereupon the nut 25 is tightened to clamp the disk 28 and cam plate 27 to the spindle 22 to rotate positively therewith.

For convenience in determining the exact location of the follower pin 31 for setting the dial and cam assembly as aforesaid, the front arm 32 is provided with a pointed portion 50, the point of which indicates the exact location of the follower pin and the front area of the front arm 32 at this place is preferably colored with a conspicuous contrasting color as indicated at 51 so that the pointer is readily distinguishable.

The cam segments 39 and 40 of each pair are circumferentially adjustable independently of the cam segments of the other pairs and are also adjustable circumferentially relatively to one another, to an extent determined by the length of the slots 39ᵇ and 40ᵇ by loosening the respective nut 42 and sliding the cam segment circumferentialy, and as explained more fully hereinafter, the composite length of the outer edge portions 44 of each pair of cam sections 39 and 40 as thus adjusted, that is, the peripheral distance from the front end of the edge portion 44 of cam segment 39 to the rear end of the edge portion 44 of the cam segment 40, determines approximately the length of time that the heating system (or cooling system if the device is used with a cooling system) will operate in maintaining at the place serviced by the heating system, the temperature normally required for the particular use for which that place is intended; that is, for residence or business or the like, such normal temperature operation being provided while the follower pin 31 is engaged by the combined outer edges 44 of any pair of cam segments 39 and 40 and the period of such normal temperature operation being variable as to duration by relative adjustment of the cam segments 39 and 40 and being variable as to the time of initiation and termination of the period by the particular location of the segments 39 and 40 relatively to the time indicia of the dial 28.

The period of time represented by the said composite length of the outer edge portions 44 of a pair of cam segments will be considered and referred to hereinafter for convenience as the predetermined heating time or period although it does not represent the full time of heater operation to provide the temperature normally required as aforesaid at the place serviced by the heating system, nor the actual length of time that the normally required temperature is provided at that place.

During the interval of time represented by the distance that adjoining pairs of cam segments 39 and 40 are separated from one another at the periphery of the cam plate 27, the follower 31 may drop down into engagement with the periphery of the cam plate 27, unless prevented, as hereinafter explained, at which time the operation of the heating system is minimized for economy purposes, and for convenience this period will be considered and referred to hereinafter as the predetermined off time or period, although it does not represent the full period of time that the heating system operation may be reduced to the minimum, as the sloping portions 46 and 47 respectively of the leading cam section 39 and the trailing cam section 40 operate under weather temperature control to vary respectively the time when operation of the heating system is initiated to provide the required normal temperature, and the time when the heating system ceases its operation of providing the required normal temperature and accordingly the length of time that the operation of the heating system is actually minimized and also the length of time that the desired normal temperature is actually provided at the place serviced by the heater varies with the weather conditions.

For providing such weather control an element 52, which is responsive to outdoor temperature, is mounted on the frame plate 18 at the front thereof, behind the dial and cam plate assembly and is of elongated cylindrical bellows type capable of expanding and contracting in the direction of its length.

This element is seated at its lower end on the hereinbefore mentioned forwardly projecting ear or lug 24 of the frame plate 18 and at its upper end has a long plunger 53 resting thereon and projecting upwardly through and slidable in a sleeve 54 which is secured at its opposite ends to a pair of forwardly projecting ears 55 of the bracket plate 18. This plunger 53 is flat at the top and at its lower end is formed with an annular enlargement 56 providing a seat for the lower end of a spring 57 which encircles the plunger 53 and bears at its upper end against the lowermost one of the pair of ears 55 to hold the plunger seated firmly against the upper end of the bellows expansion element 52.

This bellows element 52 has a long flexible capillary tube 58 connected thereto at the lower end and communicating with the interior of the bellows member and provided at its outer end with an enlargement or bulb 59 the length of the tube 58 being such that it may be extended from the location of the case containing the bellows element 52 to the exterior of the building in which the bellows element 52 is located, and mounted at a place where the said bulb 59 is exposed to the outside temperature. The case containing the control device and the bellows element 52 may be provided with an opening at any convenient place through which the capillary tube 58 extends, a slit 60 being shown in Fig. 1 at the lower end of one of the side walls 14 into which the tube 58 may be inserted sidewise.

The bulb 59, tube 58 and bellows element 52 are filled with a liquid which expands and contracts with changes of temperature and the volume of liquid in the bulb 59 is so much greater than that in the tube 58 that the expansion and contraction of the liquid in the capillary tube 58 is negligible and accordingly the expansion and contraction of the liquid in the bulb 59 directly and proportionately affects the volume of liquid in the expansible bellows element 52 and causes the latter to expand as the outside temperature increases where the bulb 59 is located and to raise and lower the plunger 53 accordingly.

Instead of the bulb-like enlargement 59, a length of flexible tubing of relatively large diameter may be provided which may be bent if required and a selected portion only of the length thereof located at the outside of the building, as in my co-pending application Serial No. 434,173 which was filed June 3, 1954, and moreover the capillary tube 58 may also be provided, as shown in said application Serial No. 434,173, at a place intermediate its ends with another length of flexible tubing, of relatively larger diameter which is adapted to be wound around a pipe as indicated by dotted lines at 61 in Fig. 7 or otherwise exposed to a source of heat in the building, to contribute the effect of the temperature at that place to modify the effect of the outside temperature in causing expansion and contraction of the bellows element 52, and it may also, if desired, have another length of large diameter flexible tubing which is represented by the dotted line coil at 139, or a bulb, located in the space serviced by the source of heat to also modify the effect of the outside temperature in causing expansion and contraction of the bellows element 52, it being understood that these additional temperature responsive enlargements are optional and either one or both may be omitted.

A switch 62 is secured by screws 63 to the back of the hereinbefore mentioned rear arm 34 at one side of the place of pivoting of said arm to swing with the latter and has a reciprocable pin 64, by which the switch is operated, projecting therefrom at the bottom directly above and toward the upper end of the plunger 53 of the bellows element 52 so that the switch pin 64 is operable by the plunger 53 to actuate the switch.

The sleeve 35 to which said rear arm 34 is secured and by which it is pivoted on the stud 33 of the frame 18, is encircled by a spring 65 and has one end 66 thereof engaged in an opening 67 of the rear arm 34 and this spring has a straight portion 68 at the other end which extends downwardly as best shown in Fig. 3 and to engage against the side of the upper one of the two front ears 55 of the frame 18, the arrangement being such that the spring 65 exerts a constant tension to swing the rear arm 34 and the switch 62 thereon downwardly to cause the switch pin 64 to engage the upper end of the plunger 53.

Such downward movement is restrained however when the front arm 32 is in the upraised position, shown in Fig. 3 and when thus restrained the switch pin 64 is at such elevation that engagement thereof with the plunger 53 cannot occur unless and until the temperature to which the outside enlargement or bulb 59 is exposed, or that temperature and other contributing controlling temperature, is sufficiently high to expand the bellows element to an extent to raise the plunger 53 to high enough level to engage the switch pin 64.

To thus restrain the downward movement of the rear arm 34 and switch 62, the said arm 34 has an extension 69 at the opposite side of the pivot stud 33 from the arm portion to which the switch 62 is attached, and this extension has a flange 70 projecting forwardly from the lower edge thereof and this flange 70 has an adjustable screw 71 projecting upwardly therethrough toward a tail-like extension 72 of the front arm 32 which provides a stop against which the upper end of the screw 71 abuts.

This screw 71 is of thumb screw type with milled head for convenient adjustment and is provided with a lock nut 73 for securing it in adjusted positions.

The flange 70 is also provided with another adjustable thumb screw 74 projecting upwardly therethrough toward a stop lug 75 which is bent forwardly from the frame plate 18 at the upper edge thereof in a position to be engaged by the upper end of the screw 74, and this screw 74 also preferably has a milled head for easy adjustment and is provided with a lock nut 76 for securing the screw 74 in adjusted positions.

The end portion 69 of the rear arm 34 from which the flange 70 projects swings in close proximity to the stop lug 75 and the latter is beveled at 77 to provide a pointer edge and the adjacent end of the rear arm has calibrations at 78 with temperature markings applied to each for convenience in adjusting the screw 74 to contact the stop lug 75 at a particular temperature indicated by the said calibrations and temperature markings.

The other end of the rear arm 34 also has calibrations 79 with temperature markings applied thereto and the front arm 32 is formed with a pointer 80 to cooperate with the calibrations 79 and their markings for adjustment of the screw 71 to provide a certain relation, determined by temperature, of the front arm 32 to the rear arm 34.

The front arm 32 is continued a considerable distance beyond the follower pin 31 thereof and at the free end has a switch 81 secured to the back thereof by screws 82 and this switch 81 has a reciprocable operating pin 83 projecting upwardly therefrom. The arm 32 is bent rearwardly at 84 immediately ahead of the switch to locate the latter rearwardly of the location of the dial and cam assembly to avoid interferences therewith and the frame plate 18 has a bracket 85 secured thereto by the screws 86 and bent rearwardly at 87 to locate the outer end thereof at a distance behind the location of the switch 81 and at said outer end, the bracket 85 has an extension 88 which projects upwardly behind the switch 81 and is provided at its upper end with a forwardly bent ear 89 which extends over the place where the pin 83 of the switch is located and has a thumb screw 90 threaded therethrough and provided with a wide head at the lower end which is positioned to be engaged by the pin 83 of the switch 81. The head of said screw 90 is milled for convenient adjustment of the screw and the latter is provided with a lock nut 91 for locking the screw 90 in adjusted positions.

This switch 81, and also the switch 62 may be of any convenient type which is suitable to perform the switching operation required in this device, a satisfactory type being shown in Fig. 6, which is a longitudinal vertical section of the switch 81, and is of a construction similar to that shown and described in my aforesaid Patent 2,333,319.

This switch 81, as shown in Fig. 6, comprises a case 92 of insulating material having a relatively long chamber therein and one of the long walls, indicated at 93, is provided with a mounting post 94 at one end to which one end of a switch arm 95 is secured, and this switch arm 95 extends lengthwise of the case 92 and has the free end thereof interposed between a contact plate 96 and a contact part of a bracket 97 which is electrically insulated from the contact plate 96.

The switch arm 95 is of resilient conductive leaf spring material and is formed with a bulge 98 near the mounted end normally providing the spring arm with a tension which holds the free end of the switch arm engaged against the contact plate 96, the arrangement being such that when the pressure is applied to the convex side of the bulge 98 the latter reacts in a manner to snap the free end of the switch arm 95 away from the contact plate 96 and into engagement with the contact part of the bracket 97.

The switch operating pin 83 is reciprocable in a guideway opening of the wall 99 of the case 92, which said wall is at the side of the case opposite to that of the wall 93, and this pin 83 is located so that the inner end thereof, which is headed as indicated at 100, is engageable with the bulge 98 of the switch arm 95 to snap it from its normal position of engagement with the contact plate 96 to the position in which it engages the contact part of the bracket 97. The post 94, contact plate 96 and bracket 97 are provided with terminal screws 101, 102 and 103 respectively to which conductors are attachable and these terminal screws have conductors connected thereto and leading to and from the switch which are sufficiently flexible to permit the swinging of the switch 81 which occurs in the operation of the device.

A connector block 106 having three mating pairs of terminal screws with the terminal screws of each pair electrically connected to one another, is preferably provided on the back wall 11 of the case of the device for convenient connection of conductors, which lead to the case, to the conductors within the case, these various conductors being shown however only in the diagrammatic illustration of Fig. 7, and another connector block 107 with two mating pairs of terminal screws is also preferably provided on the back wall 11 of the case for convenient connection of current supply conductors to the conductors in the case which lead to the closed motor.

From the foregoing explanation of the switch 81 as it is shown in Fig. 6, it is to be understood that in the absence of displacing pressure thereon by the pin 83, the switch arm 95 thereof occupies the position shown in Fig. 6 providing electrical connection from the post 94 and its terminal screw 101 to the contact plate 96 and its terminal screw 102, and it is only during such time that the switch pin 83 is engaged with the adjustable screw 90 and exerts pressure on the bulge 98 of the switch arm 95 that the switch arm 95 makes contact with the contact part of the bracket 97 and provides electrical connection from the terminal screw 101 of the post 94 to the terminal screw 103 of that bracket.

The other switch 62 may be of the same construction as the switch 81 but does not require the contact part of the bracket 97 and terminal screw 103 for switching purposes and accordingly the contact part of the bracket 97 serves only as a stop in the switch 62 and may be of electrical insulating material if desired, and in said switch 62 as in switch 81 the switch arm 95, in the absence of displacing pressure by the switch pin 64, occupies the position shown in Fig. 6, with the post 94 and its terminal screw 101 electrically connected with the contact plate 96 and its terminal screw 102 and it remains in that position at all times except when the switch pin 64 is engaged with the plunger 53 and snaps the switch arm 95 away from the contact plate 96 at which time there is no circuit connection through the switch 62.

The arrangement of the device is such that when the front arm 32 is in the upraised position, as shown in Fig. 3, with the follower pin 31 thereof on the conjoint outer edge 44 of two cam segments 39 and 40, the switch 62 will be held at such elevation that engagement of its operating pin 64 with the top of the weather controlled plunger 53 can occur only if the outside temperature reaches a level sufficiently high that no heating of the building in which the device is installed is required, and when the outside temperature reaches such high level, the plunger 53 then has risen to such level that it exercises master control to discontinue operation of the heating system as long as the outside temperature remains at or above that high level, the particular temperature of that high level being selectable by adjustment of the adjusting screw 71.

In such adjustment the switch end of the rear arm 34 is raised or lowered relatively to the position of the front switch arm 32, and the calibrations 79 of the rear arm 34 are correspondingly moved along the pointer 80 of the front arm 32 and these calibrations are arranged and marked with appropriate outside temperature indicating markings so that when the screw 71 is adjusted until the pointer 80 is opposite a selected outside temperature marking, the plunger will exercise the above mentioned master control at that outside temperature.

Such adjustment in conformity to the calibrations 79 should be made when the front arm 32 is held in the upraised position of Fig. 3 at which time the adjusting screw 71 is engaged positively and with certainty with the tail-like extension 72 of the front arm 32.

Moreover, the arrangement of the device is also such that when the front arm 32 is tilted down with the follower pin 31 thereof in the space between two adjoining pairs of cam segments 39 and 40, there is only a selected predetermined permissible extent of downward swinging movement of the rear arm 34 and its switch 62 with the front switch arm 32 is limited and the bellows element 52 is so arranged that if the outside weather temperature reaches a selected low temperature, the plunger 53 will be retracted thereby to a sufficiently low position to release the switch pin 64 when the switch is at the downward limit of its aforesaid permissible extent of downward swinging movement, and thus permit the switch 62 to close and establish connections to cause operation of the heating system under selected controls which will assure such operation of the heating system as is desirable at that time to prevent excessive reduction of temperature in the building.

Thus the plunger 53 by its movement below a position determined by a certain low outside temperature, exercises master control to assure operation of the heating system to prevent unduly low temperature in the building.

The particular low outside temperature at and below which the plunger 53 exercises this last mentioned master control depends upon the extent to which the rear arm 34 and the switch 62 thereon may swing downwardly when the follower pin 31 is in the space between adjoining pairs of cam segments 39 and 40, and such downward swinging of the rear arm and switch 62 is limited by the engagement of the adjusting screw 74 with the stop abutment 75 of the frame plate 18.

In the pivotal movement of the rear arm 34 the calibrations 78 at the outer end of the portion 69 of the arm 34 move past the index edge 77 of the stop abutment 75 and these calibrations are marked, in terms of outside weather temperature, to signify the permissible limit of downward tilting of the rear arm 34 to exercise at the indicated outside temperature the aforesaid master control of operation of the heating system to prevent unduly low temperature in the building, and the particular outside low temperature at and below which such master control is exercised may be selected by adjusting the screw 74, while the front arm 32 is swung downwardly, so that the selected outside low temperature as represented by the calibrations 78 and temperature markings thereof is directly opposite the sharp indexing edge of the stop abutment 75.

The elevation of the upper end of the plunger 53 varies with the outside temperature and between the high and low temperatures of the aforesaid master controls, engagement of the pin 64 of the switch 62 with the plunger 53 and opening or closing of said switch 62 depends upon the particular position of the front arm 32 and the corresponding position of the rear arm 34 and switch 62 at that time.

Thus when the front arm 32 is in the lowermost position with the follower pin 31 between adjoining pairs of cam segments 39 and 40, and unless the outside temperature is below the level for which the adjusting screw 71 is set, the pin 64 of the switch 62 will be engaged with the upper end of the plunger 53 and by reason of such engagement the switch 62 will be open and held by such engagement at an elevation determined by the elevation of the plunger 53, with the adjusting pin 74 separated from the stop abutment 75 and the adjusting screw 71 separated from the tail portion 72 of the front arm 32.

Then, as the next pair of cam segments 39 and 40 are advanced by the rotation of the dial and cam assembly to engage the follower pin 31, the latter will ride up the leading incline 46 and gradually swing the front arm 32 upwardly without any effect whatsoever on the switch 62 until the tail portion 72 of the front arm 32 engages the adjusting screw 71, whereupon the switch 62 will then be lifted with the front arm 32 to permit the switch pin 64 to lift from the upper end of the plunger 53 and thus cause the switch 62 to close.

Obviously therefore, the particular place along the incline 46 reached by the follower pin 31 before the front arm 32 is lifted to the point where the switch pin 64 releases from the plunger 53 and the switch closes, depends upon the particular elevation at which the switch 62 is held at the time by engagement of the switch pin 64 with the plunger 53, and accordingly in the case of cold outside temperature and a correspondingly low position of the plunger 53, the switch pin 64 will be released from the plunger 53 and the switch 62 closed when the follower pin 31 is at a correspondingly low place on the incline 46, and in the case of a high outside temperature and a correspondingly high position of the plunger 53, the switch pin 64 will not be released from the plunger 53 and the switch 62 will not close until the follower pin 31 is at the upper end portion of the incline 46 and the particular place along the incline 46 at which opening of the switch 62 occurs will thus be governed by the outside temperature.

The permissible limit of time represented by the usable length of the incline 46 is a maximum of about 4 hours, and as the closing of the switch 62 by the incline 46 may occur at any time during that approximate four hour period depending on the outside weather temperature, and as the closing of the switch 62 at that time causes operation of the heating system for build-up of heat to the normal temperature desired to be maintained in the residence or business house during the time that it is normally occupied or in use, a maximum of approximately four hours heat build up time is available in advance of the time that normal temperature is required to be provided in the residence or building to assure heating up of the residence or building to that temperature by the time it is actually required, and the amount of this available build-up time time that is utilized at each time of restoration of the desired normal temperature in the residence or building varies inversely with rise of outside temperature so that the aomunt of build up time is only of such length to assure normal temperature in the residence or building at the beginning of the period of normal occupancy or use thereof.

In like manner, but reversely, the incline 47 at the rear of the pair of segments 39 and 40, varies, in accordance with the outside temperature, the time at which normal operation of the heating system is actually discontinued at the end of each period of normal heating so that the time of minimum operation of the heating system varies according to the weather, not only as to the time of initiating the preheating or build-up but also the time of termination of normal heating.

This incline 47 at the rear end of the pair of cam segments 39 and 40 is at such a slope that a permissible period of variation of the particular time of discontinuance of normal operation of the heating system is approximately one and one-half hours and it functions to discontinue the normal operation of the heating system at such time in advance of the actual final limit of the period of time during which normal temperature is required in the residence or building, so that the residual heat maintains the required normal temperature until the said final limit of the period of time.

At the prescribed time of approximately one hour and a half in advance of the end of the period of time of desired normal heating, the follower pin 31 begins to slide down the incline 47 and the switch 62 at this time will remain closed and normal operation of the heating system will be continued until the follower pin slides down the incline 47 to a point where the switch pin 64 engages the upper end of the plunger 53, the position of which is determined by the outside temperature, and it is only when the pin 64 engages the plunger 53 that the switch 62 is opened and the normal operation of the heating system is discontinued.

Thus when the outside temperature is high the switch 62 will be opened soon after the follower pin 64 starts to slide down the incline 47 leaving a possible approximately one and one half hour length of time at the end of the period of desired normal heating, during which said approximately one and one half hours operation of the heating system is discontinued, whereas if the outside temperature is very cold, the follower pin 31 will slide down the length of the incline 47 the entire permissible length thereof or nearly the entire permissible length thereof before the switch 62 is caused to open by engagement of the pin 64 thereof with the plunger 53, and normal operation of the heating system will thus be continued until the actual end or near to the actual end of the period of desired normal heating.

For convenience in adjusting the cam segments to the proper positions to provide normal temperature at the place serviced by the heater, during the selected period of time, a black index mark 104 may be provided on each cam segment 40 at a place immediately beyond the periphery of the dial 28 and located at such place on the cam segment 40 that when that index mark 104 is placed opposite a particular selected time as represented on the dial 28, the normal operation of the heating system will be caused to occur sufficiently early or late in accordance with the outside weather temperature, to insure normal desired temperature at the place serviced by the heating system, up to the time indicated on the dial opposite the place where the index mark 104 is located, and in like manner each cam segment 39 may be provided with a similar index mark 105, preferably in red for differentiation, which is usable in a manner like the index mark 104, for setting the segment 39 according to the dial 28, at the particular place to insure that the place serviced by the heating system is heated up by appropriate length of build-up heating, to the desired normal temperature at the beginning of the time that such normal temperature is desired, as represented by the dial markings opposite the red mark 105.

By loosening the respective nuts 42 of each pair of cam segments 39 and 40 each pair thereof may be differently adjusted, by varying the distance between the index markings 104 and 105 thereof, so that each will provide the length of normal temperature period desired for the respective day of the week for which that pair of cam segments is applicable and also each pair of segments may be adjusted by locating the index marks 105 and 104 opposite respective times indicated on the dial 28, to have the period of normal temperature occur at any desired time in the 24 hours of the day to which the particular pair of cam segments is applicable.

Referring now to Fig. 7 which shows diagrammatically and for illustrative purposes only, a hook-up of the above described device for control of a burner 108 of a heater which supplies a heating medium therefrom through a pipe or duct 109 for heating a residence, place of business or the like, it is to be understood that the device above described is located within the building at a place where it is conveniently accessible for making the adjustments thereof, and the enlargement or bulb 59 is located at the exterior of the building so that it is exposed to the outside temperature. The switches 62 and 81 represented in said Fig. 7 show in full lines the switch arms 95 of both switches in the positions that they occupy during the normal heating period when the follower pin 31 is on the composite outer edge 44 of a pair of cam segments 39 and 40, said switch arms being shown in dotted lines in the positions they occupy during the time between normal heating periods when the follower pin 31 is between two adjoining pairs of cam segments 39 and 40, except at some parts of the times that the cam follower 31 is on the inclined portions 46 and 47.

This device is adapted to be employed in conjunction with or as an auxiliary to conventional heater controls, several examples of which are indicated in Fig. 7, such as the room thermostat 111 which is usually located at a place where it is subjected to the temperature of the room or rooms to be heated by the heating system and is operable to cause heat to be supplied when the temperature to which the thermostat is exposed is lower than the desired normal room temperature and is operable to discontinue the operation of the heating system when normal room temperature has been restored.

Said Fig. 7 diagram also indicates a high safety control 112 which is usually arranged to be subject to the temperature of the heating medium at the heater, for example, to the boiler heat and is operable to prevent excessive heater operation, and a low limit thermostat 113 is also shown which is designed to cause heater operation at any time when the temperature in the space to be heated is undesirably low.

Current is supplied through a pair of conductors 114 and 115 to the burner 108 to cause operation of the burner as long as the circuit is closed from the current supply conductors to the burner 108 and the supply conductor 115 is connected by the conductor 116 directly to the burner so that all of the controls are in the portion of the circuit from the supply conductor 114 to the burner.

The supply line 114 is connected by the conductor 117 to one of the terminals of the high safety control 112 and the other terminal of the high safety control is connected by the conductor 118 to one of two mating terminals 119 of the connector block 106 and the other one of the two mating terminals 119 is connected by the conductor 120 to the terminal 102 of the switch 62.

When the switch arms 95 of the switches 62 and 81 are in the positions shown in full lines in the illustrations of said switches in Fig. 7, then the terminal 102 of the switch 62 is connected through the switch arm 95 of that switch to the terminal 101 thereof and that terminal 101 is connected by the conductor 121 to the corresponding terminal 101 of the switch 81 which latter terminal 101 is in turn connected through the switch arm 95 of the switch 81 to the terminal 103 and the latter is connected by the conductor 122 to one of two mating terminals 123 of the connector block 106 and the other mating terminal 123 is connected by the conductor 124 to one of the terminals of the room thermostat 111 which has the other terminal thereof connected by the conductor 125 to the burner 108.

Thus when the follower pin 31 is on the outer combined edge 44 of any pair of segments 39 and 40 the switches 62 and 81 have their respective switch arms in the positions shown in full lines in Fig. 7 as aforesaid and the circuit is closed in the manner above explained to the burner 108 under the control of the room thermostat 111 which breaks the circuit and shuts off the burner 108 at any time the room temperature reaches the point at which the thermostat 111 is set.

The circuit from one terminal of the high safety control 112 to the other terminal thereof is constantly closed, except at such time as the heater temperature rises to an unsafe high limit and accordingly there is no interruption of current supply to the burner so long as the switch arms of the switches 62 and 81 are in the position shown in Fig. 7, except by the room thermostat 111.

The low limit thermostat 113, in which the circuit is ordinarily open between the two terminals, has these two terminals connected respectively to terminals 119 and 123 of the connector block 106 and accordingly when a low limit of temperature is reached to cause operation of the low level thermostat 113, the circuit therein closes and the burner 108 is then operated under the control of the room thermostat 111 irrespective of the positions of the switch arms 95 of the switches 62 and 81.

When the switch arms 95 of the switches 62 and 81 are in the positions shown in dotted lines in Fig. 7, then the circuit to the burner 108 is interrupted by the switch 62 and no current is suppliable to the burner unless the low limit control 113 is operable to close the circuit.

The switch 62 is in effect a single throw or on and off switch and the main switch of the control device of Fig. 1 and the switch 81 which is of double throw or three way type is auxiliary thereto, inasmuch as current is supplied to the latter switch only through the switch 62, and the switch arm 95 of the auxiliary switch 81 is connected to the terminal 103 thereof at all times except when the front arm 32 is displaced from the upraised position in which it is shown in Fig. 3. When the front arm 32 is thus displaced, the switch arm 95 of said switch 81 is then connected to the terminal 102 of said switch 81 which said terminal 102 has a conductor 126 leading therefrom to one of the mating terminal screws 127 of the connector block 106 the other mating terminal screw 127 of which is connected by the conductor 128 to the same terminal of the room thermostat 111 to which the conductor 125 is connected and thus the circuit from the terminal 102 of the switch 81 to the burner 108 by-passes the room thermostat.

Because of the by-pass arrangement, if at any time the switch 81 is displaced from the normal elevated position shown in Fig. 3 and the switch arm 95 of switch 62 is connected with its terminal 102, then current is suppliable to the burner 108 without control thereof by the room thermostat 111.

In the upraised position of the front arm 32 in which the switch arm 95 of the switch 81 is connected to the terminal 103 thereof, the switch arm 95 of the switch 62 is constantly in the closed position shown by solid lines in the switch 62 of Fig. 7, unless as explained hereinbefore, the outside temperature to which the bulb or enlargement 59 is exposed reaches the high level indicated by the pointer 80 on the scale 79 for which the adjusting screw 71 has been set, in which event the plunger 53 will have risen to an elevation to displace the switch arm 95 of the switch 62 from the terminal 102 thereof and thus break the circuit through the switch 62.

When the front arm 32 is in a depressed position and the rear arm 34 and switch 62 thereon are in the lowest position permitted by engagement of the adjusting screw 74 with the stop abutment 75, the switch pin 64 will engage the top of the plunger 53 and hold the switch arm 95 of the switch 62 in the open position at all times unless the outside temperature to which the bulb or enlargement 59 is exposed reaches the low level for which the screw 74 has been adjusted according to the scale 78, whereupon the plunger 53 will have been lowered to a sufficiently low level so that the switch pin 64 is released and the switch arm 95 of the switch 62 then closes and connects with the terminal 102 thereof, and as the switch arm 95 of the switch 81 is then in the position indicated by dotted lines in the switch 81 of Fig. 7 current will then be supplied through the above mentioned room thermostat by-passing connections 126, 128 and 125 to the burner 108 to cause operation thereof, at which time the duration of operation of the burner is controlled solely by the high safety switch 112.

Inasmuch as provision is thus made by the device of Fig. 1 to cause operation of the burner 108 when the outside temperature reaches a selected low level, this substantially eliminates the need for the low limit thermostat 113 and the latter may be omitted if desired.

At outside temperatures between the low level for which the set screw 74 is set and the high level for which the set screw 71 is set, the particular extent of downward tilting of the rear arm 32 at which the switch pin 64 engages the plunger 53 to open the switch 62 or is released from the plunger 53 and permits the switch 62 to close, depends upon the outside temperature and as the switch arm 95 of the switch 81 is in the dotted line position thereof in Fig. 7 it occurs that as the follower pin 31 rides up on the incline 46 of any cam segment 39, then at whatever time the arm 32 is tilted upwardly sufficiently by such upward riding of the follower pin 31 on the incline 46, to release the pin 64 from the plunger 53 and close the switch 62, current is then supplied through the room thermostat by-passing connections 126, 128 and 125 to the burner 108 until the follower pin 31 reaches the upper end or approximately the upper end of the incline 46 at which time the switch arm 95 of the switch 81 engages the contact 103 whereupon the current is then supplied through the conductors 122, 124 and 125, under the control of the room thermostat 111, to the burner 108.

The exact point in the movement of the follower pin 31 up the incline 46, at which the switch arm 95 of the switch 81 is snapped to engagement with the contact 103 thereof depends upon the adjustment of the screw 71 which may be set to cause such switch operation to occur when desired.

While the follower pin 31 is on the outer combined edges 44 of any pair of segments 39 and 40 the switch arm 95 of the switch 81 is in the full line position thereof shown in Fig. 7 and as the follower pin 31 begins to recede down the rear incline 47 of any pair of cam segments 39 and 40, the switch arm 95 of the switch 81 is thereupon snapped to the dotted line position thereof as shown in Fig. 7.

The switch 62 is closed at this time, unless the outside temperature is at or above the temperature on the scale 79 at which the screw 71 is set, and the distance that the follower pin 31 rides down the incline 47 before the switch pin 64 engages the plunger 53 depends upon the outside temperature.

When, however, the switch pin 64 does engage the plunger, the switch 62 is opened, whereupon the heating system becomes inoperative until the front end slope 46 of the next succeeding pair of cam segments 39 and 40 lifts the follower pin 31 again, except that during the interval until the follower pin 31 is engaged by the next succeeding incline 47, if the outside temperature reaches the low level for which the adjusting screw 74 is set, then the switch 62 will close and current will then be supplied to the burner 108 and will by-pass the room thermostat 111.

If a low level thermostat 113 is employed, current may be supplied therethrough through the room thermostat to the burner 108 at any time irrespective of the position of the switches 62 and 81.

Fig. 7 shows, in dotted lines, a capillary tube 129 which may be employed instead of the capillary tube 58 and its bulb 59, and which said capillary tube 129 has the bulb, shown by the dotted lines 59, at its outer end and located at a place where it is exposed to the outside temperature, and this capillary tube 129 has interposed therein at a suitable place or at suitable places between the bulb or outer end enlargement 59 thereof and the bellows element 52, either one or both heat sensing elements 61 and 139, the former of which is exposed at the heater to the temperature of the heating medium and is adapted to cooperate with the bulb 59 in causing expansion and contraction of the bellows element 52, and the latter of which is exposed to the temperature of the room or rooms to which heat is supplied by the heater and which is in effect a room thermostat and may be used instead of or inconjunction with the room thermostat 111. Such heat sensing elements 61 and 139 are advantageous as they modify the operation of the bellows element 52 by the contents of the outside weather bulb 59 according to the temperature of the heating medium at the heater and/or according to the temperature of the heated room or rooms and maintain a balanced effect between the outside temperature and the temperature at the heater and the temperature in the heated room or rooms, for operation of the bellows element 52 and thus avoid improvident demand by the outside bulb 59 for operation of the heater when the heating medium supplied by the heater is already at a sufficiently high temperature, or the room temperature is already sufficiently high.

The said heating element 61 is preferably an enlarged length of flexible tubing which may be bent or arranged to employ a selected length thereof for heat sensing at the heater and wrapped around a pipe as indicated at 61 in Fig. 7, such bendable enlargement being shown in my aforesaid co-pending application Serial No. 434,173, and the heat sensing element 139 may also be an enlarged length of the tubing.

A 24 hour disk and cam assembly may be employed with the above described device, if desired, such for example as shown in Fig. 8 which may and preferably is of smaller size than the 7 day dial and cam assembly shown in Fig. 1, in which event the clock spindle 22 will be located appropriately at a shorter distance from the top of the frame 18 for proper engagement of the periphery of the smaller size dial and cam assembly by the follower pin 31, and the clock will be arranged to operate the spindle 22 at the rate of one revolution in each consecutive 24 hour period.

In the dial and cam assembly of Fig. 8 the nut 25 is shown at the center thereof by which the assembly is secured on the clock operated spindle 22, and the cam parts of the assembly may be composed of three approximately circular disks 130, 131 and 132 arranged one above the other and each having corresponding extensions 130ª, 131ª and 132ª respectively along a portion of the periphery constituting cam segments which are adjustable relatively to one another circumferentially to cooperate in the same manner as the cam segments 39 and 40 of Fig. 1 to provide a combined cam outer edge of selected length.

A timing disk 133 is provided with suitable hourly calibrations and markings of two 12 hour periods, each identified respectively for A. M. and P. M. which overlies the outermost cam disk 130, and the rear disk 132 may have a threaded stem 134 fixed thereto and projecting forwardly through an arcuate slot 135 of the timing disk 133 and also through corresponding arcuate slots of the intermediate cam disks 130 and 131 and provided with a thumb nut 136 for permitting relative adjustment of all of the disks and securing them together in the adjusted position.

This cam assembly rotates, like the cam assembly of Fig. 1, in a clockwise direction as it is viewed from the front as shown in Fig. 8, and each cam extension 130, 131 and 132 has at the forward or leading end thereof an edge portion 137 of relatively gradual slope and at the rear or trailing end thereof an edge portion 138 of more abrupt slope which serve respectively the same purpose as the sloping edges 46 and 47 of the Fig. 1 construction.

While I have shown and described my invention in preferred forms, I am aware that various changes and modifications may be made therein without departing from the principles of the invention, the scope of which is to be determined by the appended claims.

What is claimed is:

1. Heat transfer control means comprising a switch which is operable to open and close a circuit, a time-controlled cam which is operable to move the switch to a prescribed position at a time selected by the cam and to retain the switch in that position during a period of time selected by the cam, and a temperature controlled member which is movable by changes of its controlling temperature and is cooperable with the switch to cause operation of the switch to open and close said circuit, the said switch being a unit which has a pair of mating contacts which are movable therewith and engageable with and separable from one another to open and close said circuit and the temperature controlled member being movable by its controlling temperature to selectable positions of cooperability with the switch and which are selectable by movement of the switch and its contacts by the cam.

2. Heat transfer control means comprising a switch which is operable to open and close a circuit, a time-controlled rotary cam by which the switch is movable to a prescribed position at a time selected by the cam and is retained in that position during a period of time selected by the cam, and a temperature controlled member which is movable by changes of temperature to provide a shiftable stop by which the opening and closing of the switch is caused to occur, the said switch being a unit which has a pair of mating contacts which are movable therewith and engagable with and separable from one another to open and close said circuit and the temperature controlled member being movable by its controlling temperature to selectable positions of cooperability with the switch and which are selectable by movement of the switch and its contacts by the cam.

3. Heat transfer control means comprising a switch which is operable to open and close a circuit, a time-controlled rotary cam by which the switch is movable to a prescribed position at a time selected by the cam and is retained in that position during a period of time selected by the cam, and a temperature controlled member which is movable by changes of temperature to cause at least one of the circuit opening and closing operations of the switch to occur during the movement of the switch toward or away from said prescribed position, the said switch being a unit which has a pair of mating contacts which are movable therewith and engageable with and separable from one another to open and close said circuit and the temperature controlled member being movable by its controlling temperature to selectable positions of cooperability with the switch and which are selectable by movement of the switch and its contacts by the cam.

4. Heat transfer control means comprising a switch which is operable to open and close a circuit, a time-controlled rotary cam by which the switch is movable to a prescribed position at a time selected by the cam and is retained in that position during a period of time selected by the cam, and a temperature controlled member which is movable by changes of temperature to cause the circuit opening and closing operations of the switch to occur at varying distances of the switch from said prescribed position according to the temperature then controlling the temperature controlled member, the said switch being a unit which has a pair of mating contacts which are movable therewith and engagable with and separable from one another to open and close said circuit and the temperature controlled member being movable by its controlling temperature to selectable positions of cooperability with the switch and which are selectable by movement of the switch and its contacts by the cam.

5. Heat transfer control means comprising a switch which is operable to open and close a circuit, a time controlled rotary cam which has an inclined portion by which the switch is progressively movable to a prescribed position and another portion by which the switch is retained in said position during a period of time determined by the length of the latter portion, and a temperature controlled member which cooperates with the switch during its movement by said inclined portion of the cam to cause one of the aforesaid circuit opening and closing operations of the switch to occur when the switch is at a distance determined by the temperature controlled member from said prescribed position.

6. Heat transfer control means comprising a switch which is operable to open and close a circuit, a time-controlled rotary cam having two oppositely inclined portions at opposite extremities of an intermediate portion, the latter of which during a period of time determined by its length holds the switch in a prescribed position to and from which it is gradually moved respectively by the two oppositely inclined cam portions, and a temperature controlled member which is adjustable in accordance with its controlling temperature and cooperable with the switch during its movements to and from said prescribed position to cause the aforesaid circuit opening and closing operations to occur at different distances of the switch from said prescribed position.

7. Heat transfer control means comprising a switch which is operable to open and close a circuit, an arm which is pivoted to move to and from a prescribed position and has a cam follower thereon, a time-controlled rotatable cam which is engaged by the follower and operable to gradually move said arm to said prescribed position and to retain the arm in said position during a period of time selected by the cam and to gradually return the said arm from said prescribed position at the conclusion of said period of time, a lost motion connection by which the switch is movable with said arm, and a temperature controlled member which is movable in response to changes of its controlling temperature and is cooperable with the switch during its movement with said arm to cause the aforesaid circuit opening and closing operations of the switch to occur.

8. Heat transfer control means in accordance with claim 7 wherein the movement of the switch is variably less than that of said arm and the said operations of the switch occur at the extremes of the movement of the switch.

9. Heat transfer control means in accordance with claim 7 wherein the switch is mounted on another arm which is pivoted at least approximately at the pivotal axis of the cam follower arm.

10. Heat transfer control means comprising a switch which is operable to open and close a circuit, a time-controlled rotary cam which is operable to move the switch to a prescribed position at a time selected by the cam and to retain the switch in that position during a period of time selected by the cam, two pivoted arms one of which has a cam follower thereon which is engaged by the cam and the other of which has the switch thereon and is operated pivotally by the arm which has the cam follower thereon, and a temperature controlled member which cooperates with the switch to cause the circuit opening and closing operations thereof, the said switch being a unit which has a pair of mating contacts which are movable therewith and engagable with and separable from one another to open and close said circuit and the temperature controlled member being movable by its controlling temperature to selectable positions of cooperability with the switch and which are selectable by movement of the switch and its contacts by the cam.

11. Heat transfer control means in accordance with claim 10 wherein the switch and the temperature controlled member are movable toward and away from one another.

12. Heat transfer control means in accordance with claim 10 wherein the two arms have an adjustable lost motion connection with one another and the movement of the switch carrying arm is limited by an adjustable stop.

13. Heat transfer control means in accordance with claim 10 wherein each arm is movable independently of the other and movement of each relatively to the other is limited respectively by an adjustable stop.

14. Heat transfer control means in accordance with claim 10 wherein another switch is mounted on the cam follower arm and cooperates with and is operated by a stop in timed relation to one of the said opening and closing movements of the switch on the other arm.

15. Heat transfer control means comprising a switch which is operable to open and close a circuit and a time-controlled rotary cam having a part of its periphery circular and an outwardly extending projection at another part of its periphery and comprising two outwardly sloped circumferential extremities by which the switch is caused to move gradually to and from a prescribed position by rotation of the cam, said outwardly extending projection having an outer periphery by which the switch is held in said prescribed position during a length of time determined by the length of said outer periphery, the said outwardly extending projection being composed of a plurality of overlapping cam segments which are relatively adjustable circularly about the axis of rotation of the cam and one of which provides one of the aforesaid two outwardly sloped circumferential extremities and another one of which provides the other one of said two outwardly sloped extremities.

16. Heat transfer control means comprising a switch which is operable to open and close a circuit and time-controlled rotary cam means which is cooperable with the switch to move the switch and retain it in a prescribed position a plurality of times in each rotation of the cam means and to hold it in said position at each of said times for a selected period of time, the said cam means comprising a cam segment supporting disk which is rotated once in each consecutive period of seven days duration and has a timing disk secured to the front thereof and rotatable circularly therewith and provided around the periphery thereof with seven consecutive sets of markings, each of which represents a twenty-four hour period of time, the said cam segment supporting disk being provided at each set of said markings with a separate set of cam segments which project beyond the periphery of both disks and provide an outer cam contour by which the switch is moved and retained in said prescribed position as aforesaid, the cam segments of each said set thereof being individually and conjointly adjustable circularly about the center of rotation of the cam segment supporting disk and provided with means by which they are retained in the same position of relative orientation in their positions of individual and conjoint adjustability.

17. Heat transfer control means comprising a switch which is operable to open and close a circuit, a movable temperature controlled member which has a range of movement along which it is movable in accordance with changes of its controlling temperature and having selectable places along its said range of movement thereof, and a time controlled member which is operable at times selected thereby to select places along said range of movement of the temperature controlled member at which said member is cooperable with the switch to cause the circuit opening and closing movement of the switch.

References Cited in the file of this patent

UNITED STATES PATENTS

| 2,045,041 | McNicoll | June 23, 1936 |
| 2,129,878 | Sambur et al. | Sept. 13, 1938 |
| 2,274,371 | Kucera | Feb. 24, 1942 |
| 2,333,319 | Kucera | Nov. 2, 1943 |
| 2,583,397 | Strysko | Jan. 22, 1952 |
| 2,744,337 | Raney | May 8, 1956 |